United States Patent Office 3,211,722
Patented Oct. 12, 1965

3,211,722
PROCESS FOR THE PREPARATION OF
C-ALKYL-ε-CAPROLACTAMS
Gustav Renckhoff, Witten (Ruhr), and Hans-Leo Hulsmann, Witten-Rudinghausen, Germany, assignors to Chemische Werke Witten G.m.b.H., Witten (Ruhr), Germany
No Drawing. Filed Feb. 27, 1962, Ser. No. 176,093
Claims priority, application Germany, Mar. 4, 1961, C 23,572
10 Claims. (Cl. 260—239.3)

The present invention relates to the production of C-alkyl-ε-caprolactams, for example, γ-methyl-ε-caprolactam.

It is known to prepare ε-caprolactam by reacting cyclohexane derivatives having a tertiary carbon atom, for example, cyclohexane carboxylic acid, with nitroslating agents in the presence of fuming sulfuric acid. Apart from cyclohexane carboxylic acid, caprolactam may also be prepared from other cyclohexane derivatives, for example, methyl cyclohexane, under the stated conditions. In view of this knowledge, it was to be expected that in the reaction of alkyl cyclohexane carboxylic acids having two tertiary carbon atoms in the cyclohexane ring with nitroslating agents in the presence of sulfuric acid, the attack on the two tertiary carbon atoms would take place with the formation of dilactams or their decomposition products. The utilization of cyclohexane derivatives having two tertiary carbon atoms, for instance, methyl cyclohexane carboxylic acid, however, under the conditions described causes, in fact a very severe reaction which is combined with a complete destruction of the molecule.

It has now been surprisingly found that, when starting with alkyl cyclohexane carboxylic acids and/or their functional derivatives, and by the action of nitroslating agents in the presence of $SO_3$-containing sulfuric acid, C-alkyl-ε-caprolactams are obtained when the reaction is carried out at a temperature below 100° C., and preferably about 80° C., under the addition of an inert diluent which boils at the reaction temperature, preferably cyclohexane; when care is taken to immediately remove the reaction heat, and when the nitroslating agent is added only to such an extent as to be instantaneously used up.

Alkyl cyclohexane carboxylic acids suitable as starting materials are, for instance, the isomeric methyl or dimethyl cyclohexane carboxylic acids, the ethyl-, propyl-, isopropyl-, etc., -cyclohexane carboxylic acids, as well as their functional derivatives, such as salts, esters, chlorides, etc.

The process of the present invention is particularly suitable for the preparation of γ-methyl-ε-caprolactam starting with 4-methyl cyclohexane carboxylic acid or its functional derivatives which are easily accessible by hydration of the corresponding derivatives of p-toluic acid.

The alkyl cyclohexane carboxylic acids and/or their functional derivatives are utilized in moderate excess, referred to the quantity of nitroslating agent used, when carrying out the reaction. The molar ratio is suitably from 1:0.5 to 1:0.9.

Nitrosyl sulfate or compounds which form nitrosyl sulfate by reaction with the fuming sulfuric acid in the reaction mixture may be used as nitroslating agents. For example, nitrosyl chloride, alkyl nitrite or nitric oxides may be used. It is expedient to add the nitroslating agent dissolved in fuming sulfuric acid having an $SO_3$ content of about 10–20% to the solution of the alkyl cyclohexane carboxylic acid derivative in the inert diluent, preferably cyclohexane, whereby the starting and advancing of the reaction may be observed on the basis of the continuous carbon dioxide formation.

The isolation of the caprolactams formed by the present invention takes place when the reaction is completed by neutralization of the reaction mixture, diluted with ice water, and by extraction of the caprolactam with a suitable solvent. The non-reacted alkyl cyclohexane carboxylic acid which can easily be separated from the caprolactam is recycled and added to a new batch for the preparation of the caprolactam.

It is accordingly, an object of the present invention to provide a new and improved process for the production of C-alkyl-ε-caprolactams.

It is a further object of the present invention to provide a process for the production of C-alkyl-ε-caprolactams from alkyl cyclohexane carboxylic acids and/or their functional derivatives.

The present process reacts alkyl cyclohexane carboxylic acids and/or their functional derivatives with nitroslating agents in the presence of fuming sulfuric acid at a temperature below 100° C., preferably 80° C., with the addition of an inert diluent such as cyclohexane which boils at the reaction temperature.

The following examples serve to further illustrate the present invention without, however, limiting the same.

*Example I*

665 g. of 4-methyl cyclohexane carboxylic acid methyl ester and 500 ml. of cyclohexane are heated to 80° C. in a 4-liter three-necked flask provided with stirring attachment, dropping funnel and thermometer. After this temperature has been reached, a solution of 415 g. of nitrosyl sulfate in 720 g. of fuming sulfuric acid having an $SO_3$ content of about 15% is added within 4½ hours while stirring vigorously, while the cyclohexane is constantly boiling moderately. After completion of the addition, stirring is continued for another hour with the temperature remaining at 80° C. The reaction product is then poured on to about 4 kg. ice, the cyclohexane layer is separated, and the aqueous sulfuric acid adjusted with a strong sodium lye to a pH value of 8. The neutralized solution whose volume amounts to about 6 liters, is extracted exhaustively with chloroform at 30–35° C. The chloroform extract furnishes as residue the crude γ-methyl-ε-caprolactam in the form of sirup from which 187.5 g. of pure γ-methyl-ε-caprolactam with a melting point of 38–39° C. are obtained by distillation in vacuo at a boiling point of 148–149° C. at 14 torr. From the cyclohexane layer, 177 g. of unchanged 4-methyl cyclohexane carboxylic acid methyl ester and 131 g. of 4-methyl cyclohexane carboxylic acid are returned. Another 60 g. of 4-methyl cyclohexane carboxylic acid can be extracted from the aqueous phase after acidification following the chloroform extraction of the methyl caprolactam. Thereafter, the yield of γ-methyl-ε-caprolactam amounts to 83.5% of the theory referred to the methyl cyclohexane carboxylic acid reacted.

*Example II*

142 g. of 4-methyl cyclohexane carboxylic acid, B.P.$_{16}$ 130–132° C., and 200 ml. of gasoline, B.P. 75° C., are heated to 70–75° C. in a 750 ml. three-necked flask provided with a stirring attachment, reflux condenser, dropping funnel and thermometer. Spaced over 1½ hours, a solution of 100 g. of nitrosyl sulfate in 300 g. of fuming sulfuric acid with an $SO_3$ content of about 15% are added in small portions while stirring vigorously in such a manner that the gasoline boils slightly under reflux. Upon the completion of the admixture of the nitroslating agent, stirring is continued for another hour at 75° C. The reaction product is then put on about 1 kg. of ice, the gasoline layer is separated and the aqueous solution of sulfuric acid is adjusted to a pH value of 8 with a strong soda lye. After extraction of the salt solution with chloroform and distillation of the chloroform residue in vacuo, 33.4 g. of γ-methyl-ε-caprolactam having a melting point of 37–39° C. are obtained. 89.8 g. of 4-methyl cyclohexane carboxylic acid are recovered from the aqueous solution free from methyl caprolactam after acidification by renewed chloroform extraction. Thus, the yield of γ-methyl-ε-caprolactam, referred to the 4-methyl cyclohexane carboxylic acid reacted, is 71.5% of the theory.

*Example III*

In an apparatus as described in Example II, 119 g. of 4-methyl cyclohexane carboxylic acid, B.P.$_{16}$ 130–132° C., are heated to 80° C. with 100 ml. of cyclohexane and 250 g. of fuming sulfuric acid. 44 g. of finely powdered sodium nitrite are added in portions in the course of 6 hours. The preparation of the reaction product and isolation of the γ-methyl-ε-caprolactam takes place according to the steps given in Example II above. 6.1 g. of pure γ-methyl-ε-caprolactam having a melting point of 37–39° C. are obtained. 105 g. of non-reacted 4-methyl cyclohexane carboxylic acid are recovered. The yield of γ-methyl-ε-caprolactam amounts to 48.7% of the theory, referred to the 4-methyl cylcohexane carboxylic acid reacted.

*Example IV*

116.5 g. of 2,4-dimethyl cyclohexane carboxylic acid, B.P.$_{10}$ 130–131° C., and 100 ml. of cyclohexane are heated to 80° C. in the apparatus described in Example II. During 1½ hours, a solution of 85 g. of nitrosyl sulfate in 300 g. of fuming sulfuric acid having an SO$_3$ content of about 15% is dropped in while stirring vigorously, whereby the cyclohexane moderately boils on the reflux. When the admixture is completed, stirring is continued for another hour at 80° C. The reaction batch is then poured onto 1 kg. ice, the cyclohexane layer is separated, and the acid aqueous phase adjusted to a pH value of 8 with a strong soda lye. The faintly alkaline aqueous solution is exhaustively extracted with chloroform at 30–35° C. After distillation of the chloroform, there remain 44.4 g. of crude β,δ-dimethyl-ε-caprolactam in crystalline form. Upon twice recrystallizing the crude product from toluene, 36.5 g. of colorless, pure β,δ-dimethyl-ε-caprolactam are obtained having a melting point of 127–128° C. 67.2 g. of 2,4-dimethyl cyclohexane carboxylic acid are recovered from the aqueous solution freed from dimethyl caprolactam after acidification. Thus, the yield of pure β,δ-dimethyl-ε-caprolactam amounts to 81.9% of the theory, referred to the 2,4-dimethyl cyclohexane carboxylic acid reacted.

Of course, changes and variations in the reactions conditions, the manner of working-up the reaction mixture, the manner of isolating and purifying the resulting products, and the like, may be made by those skilled in the art in accordance with the principles and limitations set forth hereinabove, and we, therefore, do not wish to be limited to the details and specific examples described hereinabove only for illustrative purposes but intend to cover all such changes and modifications as are encompassed by the scope of the appended claims.

We claim:

1. A process for the preparation of C-alkyl-ε-caprolactams by the reaction of a compound selected from the group consisting of alkyl cyclohexane carboxylic acids, their functional derivatives and mixtures thereof, comprising reacting said compound with a nitroslating agent in the presence of SO$_3$-containing sulfuric acid at a temperature not exceeding 100° C. under the addition of an inert diluent which boils at the reaction temperature while drawing off the reaction heat, said nitroslating agent being slowly added to said compound in such an amount as to instantaneously be used up.

2. A process according to claim 1, wherein said compound is utilized in a molar ratio of between about 1:0.5 and 1:0.9, referred to the amount of nitroslating agent added.

3. A process according to claim 1, wherein the nitroslating agent is dissolved in said sulfuric acid and thereafter the mixture thereof is added to said compound.

4. A process according to claim 3, wherein said sulfuric acid contains between approximately 10 and 20% SO$_3$.

5. A process according to claim 3, wherein said nitroslating agent is selected from the group consisting of nitrosyl sulfate and compounds forming the same in sulfuric acid.

6. A process for the preparation of γ-methyl-ε-caprolactam by the reaction of a compound selected from the group consisting of 4-methyl-cyclohexane carboxylic acid, its functional derivatives and mixtures thereof, comprising reacting said compound wtih a nitroslating agent in the presence of fuming sulfuric acid at a temperature of approximately 80° C. under the addition of an inert diluent which boils at the reaction temperature while drawing off the reaction heat formed, said nitroslating agent being slowly added to said compound in such an amount as to be instantaneously used up.

7. A process according to claim 6, wherein said nitroslating agent is selected from the group consisting of nitrocyl sulfate and compounds forming the same in sulfuric acid.

8. A process for the preparation of C-alkyl-ε-caprolactams by the reaction of a compound selected from the group consisting of alkyl cyclohexane carboxylic acids, their functional derivatives and mixtures thereof, comprising reacting said compound with a nitroslating agent in the presence of fuming sulfuric acid at a temperature not exceeding 100° C. under the addition of cyclohexane which boils at the reaction temperature while drawing off the reaction heat formed, said nitroslating agent being dissolved in said sulfuric acid and the mixture thereof being added to said compound, said nitroslating agent being added in such an amount as to be instantaneously used up.

9. A process according to claim 8, wherein said compound is utilized in a molar ratio of between about 1:0.5 and 1:0.9 referred to the amount of nitroslating agent added.

10. A process according to claim 9, wherein said temperature is approximately 80° C.

References Cited by the Examiner

UNITED STATES PATENTS

| 3,022,291 | 2/62 | Muench et al. | 260—239.3 |
| 3,062,812 | 11/62 | Taylor | 260—239.3 |
| 3,090,739 | 5/63 | Ito | 260—239.3 |

FOREIGN PATENTS

| 52,901 | 3/60 | Australia. |
| 52,908 | 3/60 | Australia. |
| 58,823 | 9/60 | Australia. |
| 1,238,981 | 7/60 | France. |

OTHER REFERENCES

Royals: "Advanced Organic Chemistry," pp. 315–28 (Prentice-Hall) (1954).

WALTER A. MODANCE, *Primary Examiner.*

DUVAL T. McCUTCHEN, IRVING MARCUS,
*Examiners.*